(12) United States Patent
Matsunoshita et al.

(10) Patent No.: US 7,505,179 B2
(45) Date of Patent: Mar. 17, 2009

(54) PRINT CONTROLLING APPARATUS, METHOD, AND STORAGE MEDIUM FOR GENERATING PRINT IMAGE DATA OF A PARTICULAR COLOR SPACE REPRESENTING A PRINT OBJECT DOCUMENT IN THE FORM OF A PLURALITY OF COLOR COMPONENTS

(75) Inventors: Junichi Matsunoshita, Ashigarakami-gun (JP); Hirofumi Komatsubara, Ashigarakami-gun (JP); Kenji Ebitani, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 721 days.

(21) Appl. No.: 11/067,787

(22) Filed: Mar. 1, 2005

(65) Prior Publication Data
US 2006/0033962 A1    Feb. 16, 2006

(30) Foreign Application Priority Data
Aug. 11, 2004   (JP) .............................. 2004-234360

(51) Int. Cl.
H04N 1/40 (2006.01)
G06K 1/00 (2006.01)
G06K 9/00 (2006.01)
G06F 15/00 (2006.01)

(52) U.S. Cl. .................. 358/3.28; 382/100; 358/1.9
(58) Field of Classification Search .................. 358/1.1, 358/1.9, 515, 500, 3.28; 382/162, 100
See application file for complete search history.

(56) References Cited

U.S. PATENT DOCUMENTS

| 6,044,173 | A | * | 3/2000 | Kumada | 382/167 |
| 2002/0061122 | A1 | * | 5/2002 | Fujihara et al. | 382/100 |
| 2002/0067507 | A1 | * | 6/2002 | Kujirai | 358/1.18 |
| 2002/0069778 | A1 | * | 6/2002 | Jacobs | 101/484 |
| 2002/0113985 | A1 | * | 8/2002 | Tayuki | 358/1.9 |
| 2003/0044043 | A1 | * | 3/2003 | Kaneda | 382/100 |
| 2003/0234943 | A1 | * | 12/2003 | Van Bael | 358/1.9 |
| 2004/0032602 | A1 | * | 2/2004 | Teraue | 358/1.9 |
| 2004/0258277 | A1 | * | 12/2004 | Ueda | 382/100 |

FOREIGN PATENT DOCUMENTS

| EP | 1449674 | 8/2004 |
| JP | 2003-136828 | 5/2003 |

* cited by examiner

Primary Examiner—Mark K Zimmerman
Assistant Examiner—Ming Hon
(74) Attorney, Agent, or Firm—Oliff & Berridge, PLC

(57) ABSTRACT

A print control apparatus which performs printing process with a printer using coloring agents of the plurality of color components includes: an identification image controller that controls to add the identification image data to the print image data without color space conversion being performed when the printer prints the document in which the identification image is composed. The identification image includes an embedding image and an embedded image. The embedding image and the embedded image are formed to be superposed on each other, and the embedded image is processed in advance so that visual identification of the embedding image is difficult under visible light when the embedding image and the embedded image are printed.

16 Claims, 8 Drawing Sheets

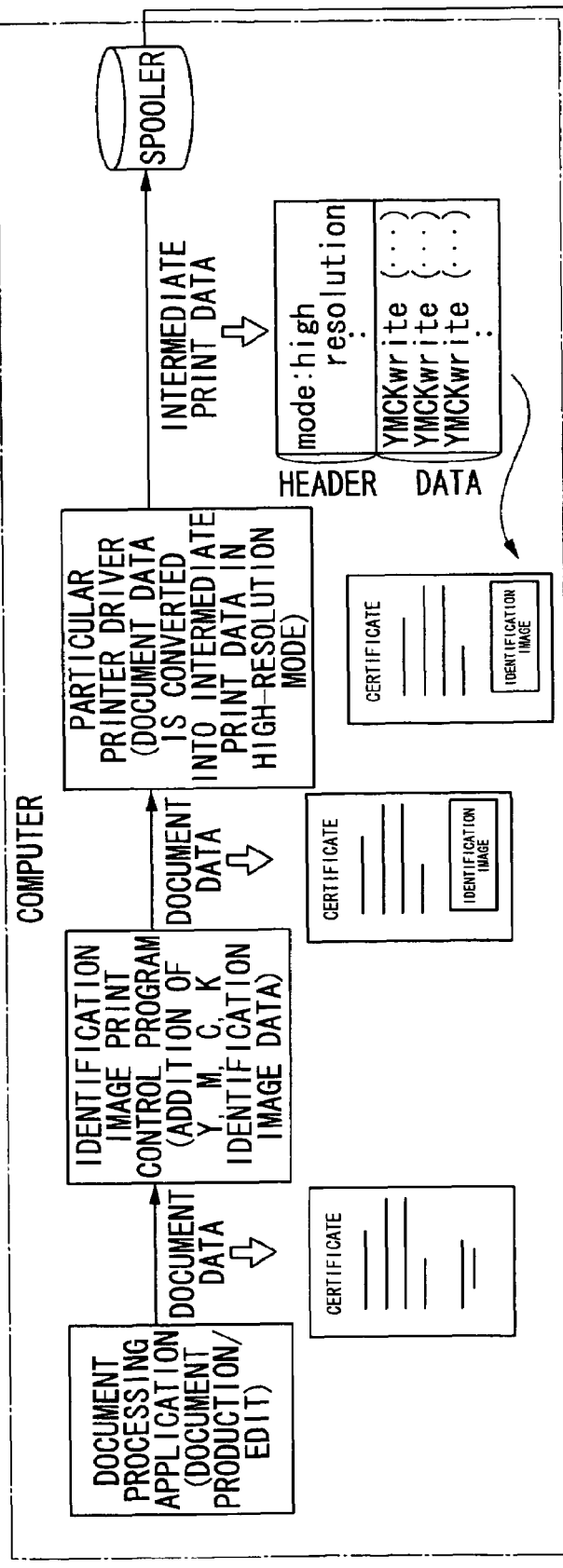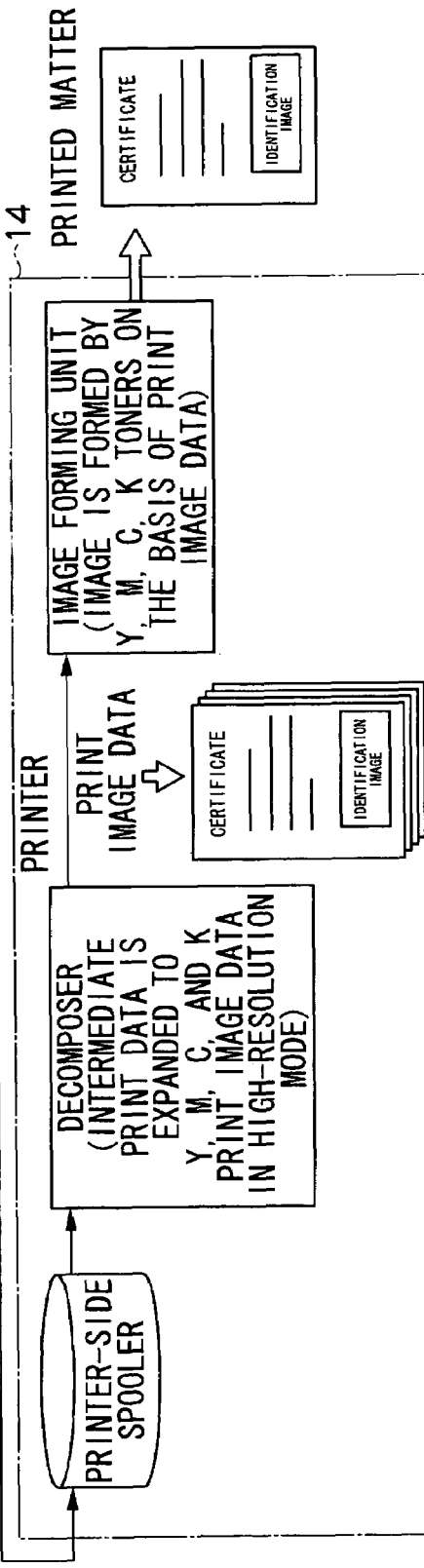
FIG.3

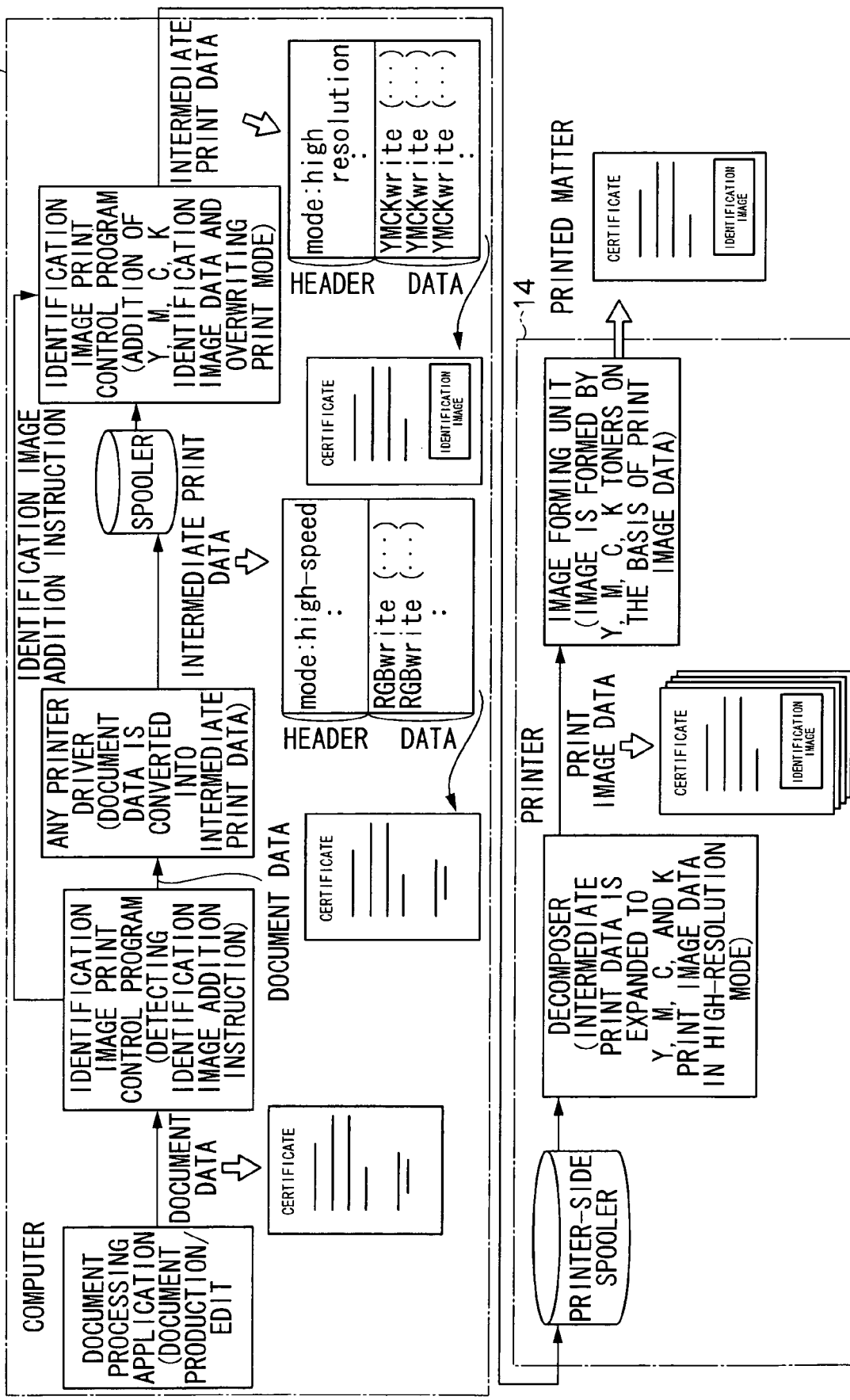

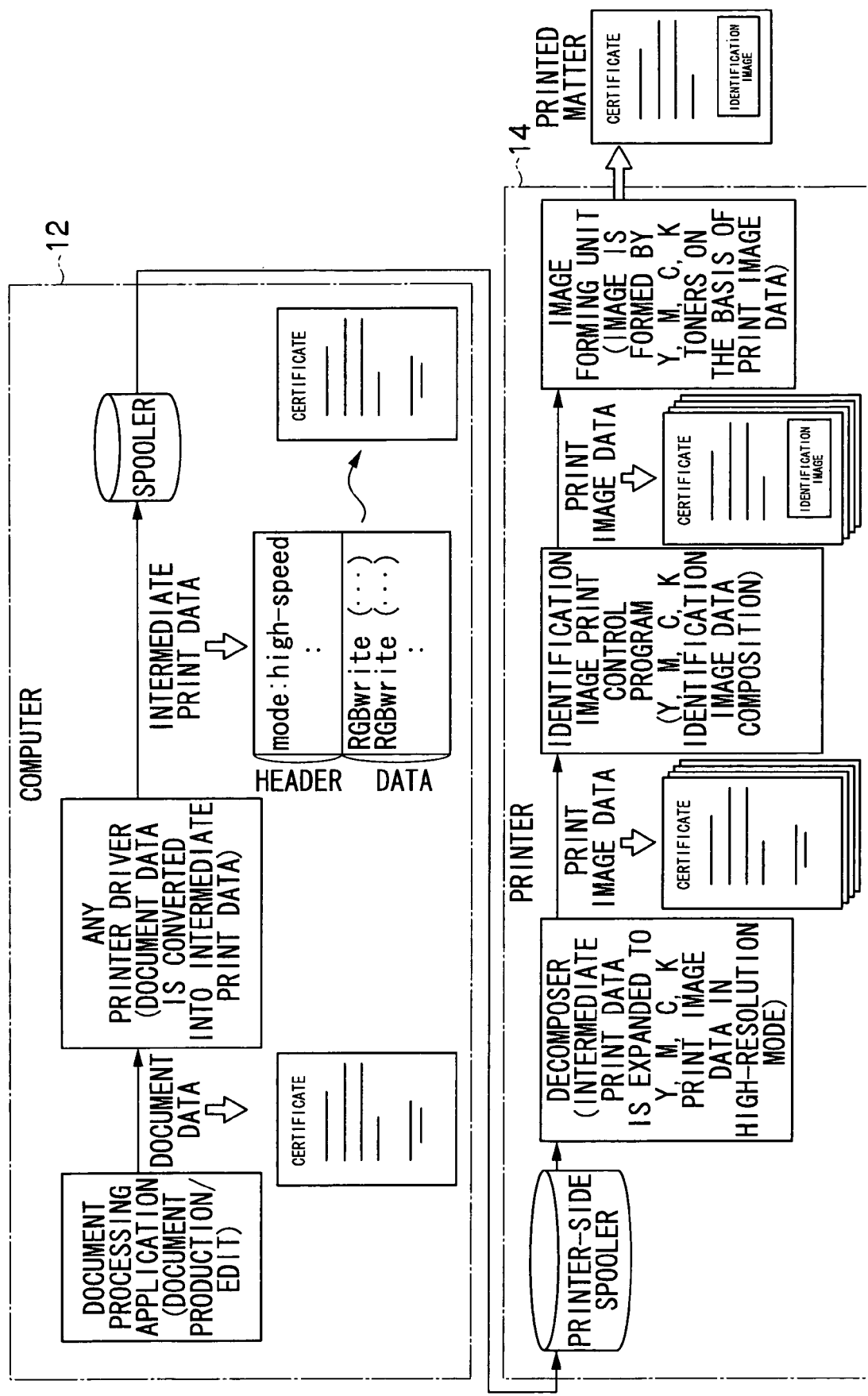

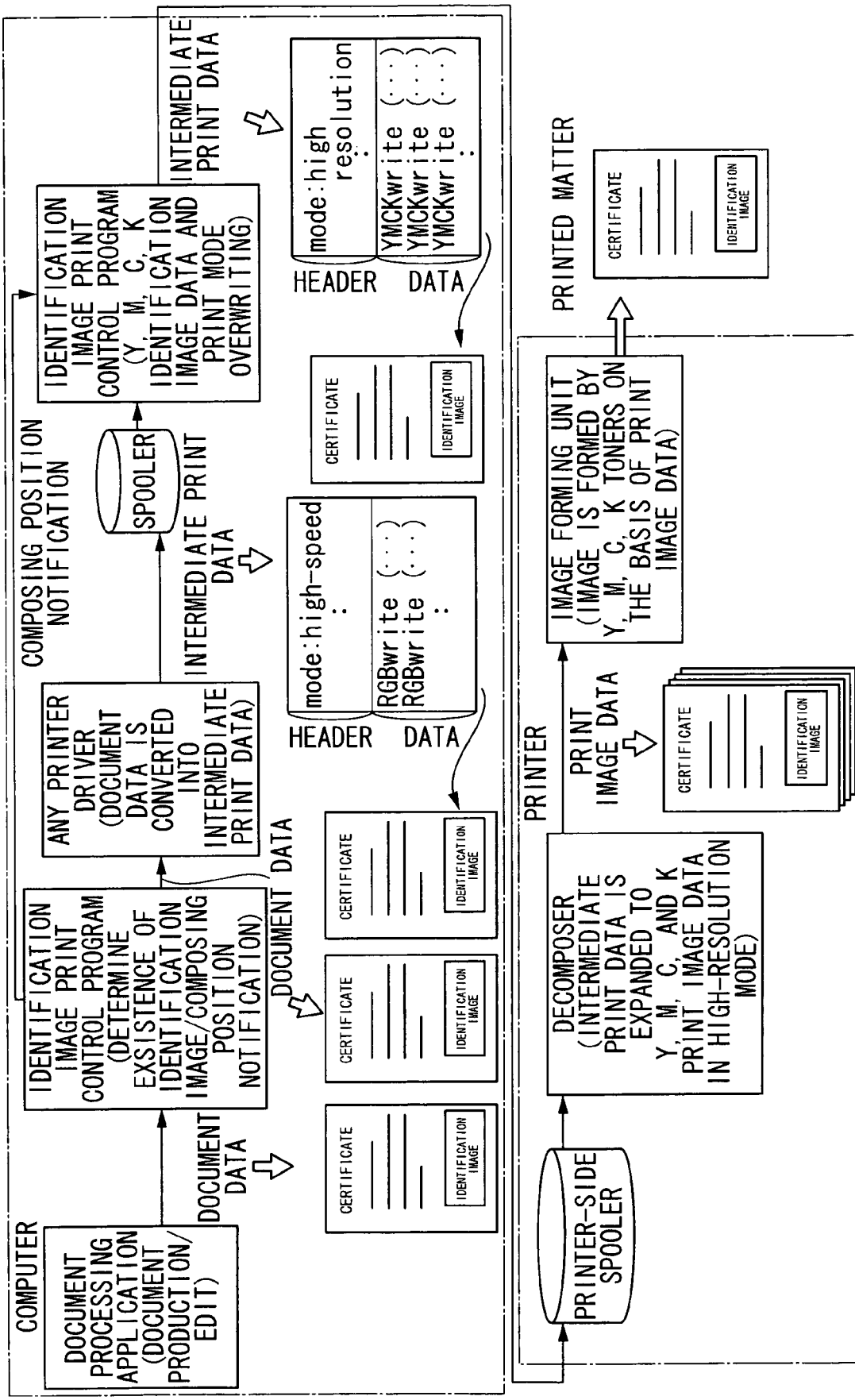
FIG.8 ASPECT IN WHICH IDENTIFICATION IMAGE IS OVERWRITTEN AND PRINT MODE IS FORCED TO OVERWRITTEN AFTER COMPOSING POSITION IS SPECIFIED IN TEMPORARY IDENTIFICATION IMAGE

PRINT CONTROLLING APPARATUS, METHOD, AND STORAGE MEDIUM FOR GENERATING PRINT IMAGE DATA OF A PARTICULAR COLOR SPACE REPRESENTING A PRINT OBJECT DOCUMENT IN THE FORM OF A PLURALITY OF COLOR COMPONENTS

CROSS-REFERENCE TO RELATED APPLICATION

This application claims priority under 35 USC 119 from Japanese Patent Application No. 2004-234360, the disclosure of which is incorporated by reference herein.

BACKGROUND OF THE INVENTION

1. Field of the Invention

The present invention relates to a print control method, apparatus, and a storage medium. Particularly, the invention relates to a print control apparatus for generating print image data of a particular color space representing a print object document in the form of a plurality of color components into which the document has been separated by performing predetermined processing of document information of the print object document, in order to print the document with a printer using coloring agents of the plurality of color components. Further, the invention relates to a print control method which is applicable to the print control apparatus, and a storage medium storing a print control program for causing a computer to function as the print control apparatus.

2. Description of the Related Art

Recently, as the performance of copying machines and printers has been improving, cases in which reproductions of bank bills, marketable securities, or the like copied by copying machines or printers are illegally used are increasing. In order to prevent the illegal use of the reproductions, it is particularly desired that a technology be secured which can determine the authenticity of various documents (in addition to bank bills or marketable securities, for example, passports, various title certificates, residence certificates, birth certificates, insurance papers, guarantee certificates, and confidential documents) printed on various kinds of paper with high accuracy.

It is known to provide a technology for composing, on various paper printed documents, an image which allows identification of the authenticity of the documents by utilizing the fact that only K ink contains an infrared absorption color of all the inks for color components of Y (Yellow), M (Magenta), C (Cyan), and K (Black). First regions formed in m by m pixels (m is an integer not lower than 2) and second regions formed in n by n pixels (n is an integer not lower than 1 and lower than m) are provided in an identification image. Plural independent first regions are arranged around a single second region with no spaces between, and plural independent second regions are arranged along the outer periphery of a single first region at substantially equal intervals. An embedded image, to be printed with the inks of Y, M, and C is placed on the first regions in the form of a dot image, and an embedding image to be printed with the K ink is placed on the second regions in the form of a dot image.

According to the above described technology, in an authorized print method, the embedding image embedded in an identification image is printed only with the K ink containing the infrared absorption color, so that existence of the embedding image can be recognized when the identification image is observed under irradiation of infrared light. On the other hand, when a document with an identification image printed with an authorized print method is copied (for example, by reading the document with the identification image with a scanner and printing it with a printer), the scanner cannot distinguish "black" in the embedded image formed with the inks of Y, M, and C, from "black" in the embedding image formed with the K ink. Therefore the embedded image and the embedding image cannot be separated from each other. Accordingly, it is possible to determine that the copied document is a fake because the embedding image cannot be reproduced in the identification image of the copied document (i.e., the existence of the embedding image cannot be recognized even if the identification image is irradiated with infrared light). Thus, in this technology special inks are not required, and determination of the authenticity of a document can be realized at low cost.

The above described technology is based on printing with the inks of Y, M, C, K commonly used in commercial printing. Also for toners of Y, M, C, K, since only K toner contains the infrared absorption color in the same manner as the inks, it is expected that determination of the authenticity of a document will be realizable by applying the technology in a case where a document is printed with a printer which forms images electrophotographically using the toners of Y, M, C, K.

However, when a document is printed with a printer on the basis of information of a print object document, although the printing is finally performed using the toners of Y, M, C, K, in order to effectively utilize resources such as processing speed and memory, usually the information of the print object document is once converted into image data of a color space other than Y, M, C, K such as R, G, B or L*a*b at some midpoint to perform various kinds of image processing. Then the image data of the color space other than Y, M, C, K is reconverted into the image data of Y, M, C, K to perform printing. Once the document information to which the information of the identification image is added is converted into the image data of the color space other than Y, M, C, K, the information of the embedding image and the information of the embedded image, both included in the identification image, are mixed together in the post-conversion image data. Therefore, there are problems in which an identification image represented by the original identification image cannot be correctly printed and the authenticity of the document cannot be determined on the basis of the printed identification image.

SUMMARY OF THE INVENTION

In view of the foregoing, the present invention has been made to provide a print control apparatus, method, and a storage medium storing a print control program which can correctly print an identification image added to a document so that the authenticity of the document can be determined.

A first aspect of the invention is a print control apparatus that generates print image data of a particular color space representing a print object document in the form of a plurality of color components into which the document has been separated by performing predetermined processing of document information of the print object document, in order to print the document with a printer using coloring agents of the plurality of color components, the print control apparatus including: an identification image controller that controls identification image data given as data of the particular color space representing an identification image in the form of separated color components, to add the identification image data to the print image data without color space conversion being performed when the printer prints the document in which the identification image is composed, wherein the identification image includes an embedding image including only one particular color component from among the plurality of color components, and an embedded image including color components from the plurality of color components other than the particular color component, the embedding image and the embedded image are formed to be superposed on each other, and the embedded image is processed in advance so that visual identification of the embedding image is difficult under visible light when the embedding image and the embedded image are printed.

The print control apparatus of the first aspect performs a predetermined processing for causing the printer to print the print object document using the coloring agents of the plural color components (for example, Y, M, C, K.) Thereby, the print image data of the particular color space (for example, Y, M, C, K color space) representing the print object document in the form of the separated plural color components is generated. In the aspect, the print control apparatus causes a printer to print the document with the identification image composed thereon. The identification image includes the embedding image including only the particular color component from among the plurality of color components, and the embedded image including color components from among the plurality of color components other than the particular color component, which are superposed on each other. The document in which the embedded image is previously processed such that the visual identification of the embedding image is difficult in visible light when the embedding image and the embedded image are printed. In this case, the identification image controller controls the identification image data given as the data of the particular color space representing the identification image in the plural separated color components to be composed in the print image data without being subjected to a color space conversion.

In this manner, the identification image data given as the data of the particular color space is printed by the printer without performing the color space conversion, thereby the data of the embedding image and the embedded image data both included in the identification image data are prevented from mixing together by the color space conversion. As a result, in accordance with the print control apparatus of the present invention, the identification image added to the document can be correctly printed so that the authenticity of the document can be determined.

A second aspect of the invention is a print control method for generating print image data of a particular color space representing a print object document in the form of a plurality of color components into which the document has been separated, by performing predetermined processing of document information of the document in order to print the print object document with a printer using coloring agents of the plurality of color components, the print control method including: controlling identification image data given as data of the particular color space representing an identification image in the form of the separated color components to add the identification image data to the print image data without performing color space conversion when printing the document on which the identification image is composed, wherein the identification image includes an embedding image including only one particular color component from among the plurality of color components, and an embedded image including color components from among the plurality of color components other than the particular color component, the embedding image and the embedded image are formed to be superposed on each other, and the embedded image is processed in advance such that visual identification of the embedding image is difficult under visible light when the embedding image and the embedded image are printed.

A third aspect of the invention is a print control method for generating print image data in order to print a print object document in which an identification image is composed thereon by a printer connected to a computer, using coloring agents of a plurality of color components, the method including: installing in advance a particular printer driver, which can perform printing without converting print object data of a particular color space into data of another color space, as a printer driver which performs first processing, in the computer; setting in advance so that the first processing is always performed in a first print mode by the particular printer driver, when a first print mode that performs printing without once converting the print object data of the particular color space into data of another color space, and a second print mode that performs printing after print object data of the particular color space is once converted into the data of another color space, are provided in the particular printer driver; wherein the identification image includes an embedding image including only a particular color component from among the plurality of color components and an embedded image including color components from among the plurality of color components other than the particular color component, the embedding image and the embedded image are formed to be superposed on each other, and the embedded image is processed in advance such that visual identification of the embedding image is difficult under visible light when the embedding image and the embedded image are printed; and the generation of the print image data includes first processing that converts the document information into intermediate print data described in a page description language by the printer driver, and second processing that expands the intermediate print data into the print image data of the particular color space, which represents the document in the form of the plurality of color components into which the document has been separated, by a decomposer.

In the third aspect, the print control method generates the print image data for printing the document with the identification image composed thereon by a printer connected to a computer, using color agents of plural color components. The identification image includes the embedding image including only the particular color component from among the plurality of color components and the embedded image including color components from among the plurality of color components other than the particular color component, which are formed to be superposed on each other. The embedded image is previously processed so that the visual identification of the embedding image is difficult in visible light. The print image data can be generated by converting the document information of the print object document into intermediate print data described in the page description language by the printer driver, and expanding the intermediate print data into the print image data of the particular color space, which represents the document in the form of the plural separated color components, by the decomposer.

Here, in order to print the document with a particular printer, plural types of printer drivers are usually provided as the printer driver for performing the first processing in which the document information is converted into the intermediate print data described by the page description language. However, among the plural types of printer drivers, a printer driver is often included which performs printing after the print object data of the particular color space is always converted into data of another color space. For example, a printer driver which converts the document information during the first processing, or a printer driver which converts the print object data of the particular color space during a process of expanding the intermediate print data into the print image data of the particular color space cab be included. Further, plural print modes are usually provided in the printer drivers. However, the plural print modes often include a mode in which the printing is performed always after the print object data of the particular color space is converted into data of another color space.

On the contrary, in the third aspect, the particular printer driver, which can perform printing without converting the print object data of the particular color space into data of another color space, is previously installed as the printer driver for performing first processing in the computer. Additionally, when a first print mode which performs printing without once converting the print object data of the particular color space into data of another color space, and a second print mode which performs printing after the print object data of the particular color space is once converted into data of another color space are provided in the particular printer driver, setting is previously made so that the first processing is always performed in the first print mode by the particular printer driver. Thus, the identification image added to the document can be correctly printed so that the authenticity of the document can be determined. Further, when printing the document in which the identification image is composed, since it is not necessary for a user to properly select the printer driver or the print mode in order to print the identification image composed in the print object document correctly, burden on a user can be reduced.

A fourth aspect of the invention is a computer readable storage medium storing a program for a computer to execute processing for generating print image data of a particular color space representing a print object document in the form of a plurality of color components into which the document has been separated by performing predetermined processing of document information of the print object document, in order to print the document with a printer using coloring agents of the plurality of color components, the processing including: controlling identification image data given as data of the particular color space representing an identification image in the form of separated color components to compose the identification image data in the print image data without performing color space conversion when printing the document in which the identification image is composed, wherein the identification image includes an embedding image including only a particular color component from among the plurality of color components and an embedded image including color components from among the plurality of color components other than the particular color component, the embedding image and the embedded image are formed to be superposed on each other, and the embedded image is processed in advance such that visual identification of the embedding image is difficult under visible light when the embedding image and the embedded image are printed.

The fourth aspect is the storage medium storing a program for a computer to function as the identification image controller of the first aspect. Accordingly, the computer functions as the print control apparatus similar to the first aspect by executing the print control program stored in the storage medium of the fourth aspect. Therefore, as with the print control apparatus of the first aspect, the identification image added to the document can be correctly printed so that the authenticity of the document can be determined.

As described above, the invention controls the identification image data given as the data of the particular color space representing the identification image in the plural separated color components to be composed in the print image data without performing color space conversion thereto, when printing the document in which the identification image is composed. Therefore, the invention has an excellent advantage in that the identification image added to the document can be correctly printed so that the authenticity of the document can be determined.

Further, in the invention, the particular printer driver, which can perform printing without converting the print object data of the particular color space into the data of another color space, is previously installed as the printer driver which performs first processing in the computer. Furthermore, when first print mode which performs printing without once converting the print object data of the particular color space into the data of another color space, and second print mode which performs printing after the print object data of the particular color space is once converted into the data of another color space are provided in the particular printer driver, setting is previously made so that the first processing is always performed in the first print mode by the particular printer driver. Therefore, the invention achieves an excellent advantage in that the identification image added to the document can be correctly printed so that the authenticity of the document can be determined.

BRIEF DESCRIPTION OF THE DRAWINGS

Embodiments of the present invention will be described in detail based on the following figures, wherein:

FIG. 3 is a concept view showing an example of document print processing in a first embodiment;

FIG. 6 is a concept view showing the document print processing in a third embodiment;

FIG. 7 is a concept view showing the document print processing in a fourth embodiment; and FIG. 8 is a concept view showing the document print processing in a fifth embodiment.

DETAILED DESCRIPTION OF THE INVENTION

Referring to the accompanying drawings, preferred embodiments of the present invention will be described in detail.

First Embodiment

Figure 1:
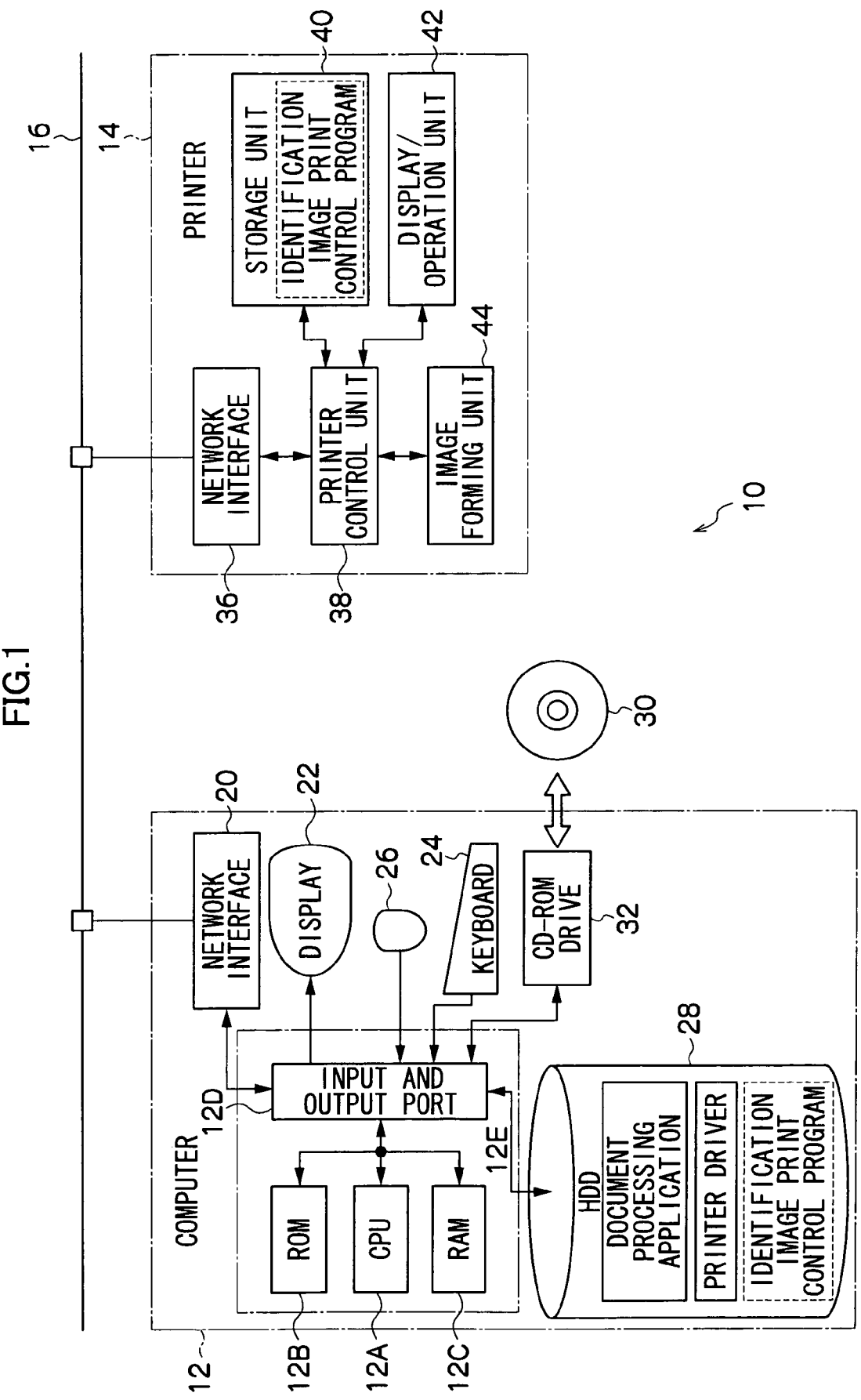
FIG. 1 is a block diagram showing a schematic configuration of a print system according to embodiments of the invention.

FIG. 1 shows a print system 10 according to the present embodiment. The print system 10 includes a computer 12 and a printer 14 which are connected to each other through a communication line 16 such as LAN. The print system 10 is not limited to the configuration in which the single computer 12 is provided. Plural computers 12 can be provided in the print system 10. Although a personal computer (PC) is suitable as the computer 12, it is not limited to a PC, and other computers such as a workstation may be used as the computer 12. Alternatively, plural PCs, which act as a client, and a workstation, which acts as a server, can be also provided respectively.

The computer 12 includes a CPU 12A, ROM 12B, RAM 12C, and an input/output port 12D, each of which being connected to each other through a bus 12E including a data bus, a control bus, an address bus or the like. The input/output port 12D is connected to various input/output devices including a network interface 20 connected to a communication line 16, a display 22 including CRT or LCD, a keyboard 24, a mouse 26, a hard disk drive (HDD) 28 which is a storage medium, and a CD-ROM drive 32 reading information from CD-ROM 30. A document processing application program which produces a document to be printed with a printer 14 (print object document) or updates (edits) the produced document, a printer driver program which prints the document by the printer 14, and a spooler program (described later) are installed on the HDD 28 of the computer 12.

In some of the later-described embodiments, as shown by a broken line in FIG. 1, an identification image print control program is also installed (stored) on the HDD 28 of the computer 12. There are some methods for installing the identification image print control program in the computer 12. For example, the method may involve recording the identification image print control program and a setup program on the CD-ROM 30, and loading the CD-ROM 30 in the CD-ROM drive 32, thereby instructing the execution of the setup program with respect to the CPU 12A. The identification image print control program is sequentially read from the CD-ROM 30, and written to the HDD 28, thus installing the identification image print control program. In the embodiment in which the identification image print control program is installed in the HDD 28 of the computer 12, the computer 12 acts as an identification image controller of the print control apparatus according to the invention by executing the identification image print control program with the CPU 12A.

The printer 14 includes a network interface 36 connected to the communication line 16, and a printer control unit 38, which includes a microcomputer, that is connected to the network interface 36. The printer control unit 38 controls operation of each unit of the printer 14, and performs various kinds of processing, for example, decomposition processing for generating print image data (later described). The printer control unit 38 is connected to a storage unit 40, a display and operation unit 42, and an image forming unit 44. The storage unit 40 includes non-volatile storage devices such as a HDD and a flash memory and volatile storage devices such as a RAM. The display and operation unit 42 is constituted with a display unit including an LCD panel or the like and operation units including ten keys and the like. The image forming unit 44 prints the document on a recording paper by forming a color image electrophotographically using toners of Y, M, C, K color components on the basis of the print image data inputted from the printer control unit 38, and then transferring and fixing the color image on the recording paper. The print image data is bitmap data of Y, M, C, K color space, which represents the document in the form of Y, M, C, K color components into which the document has been separated.

A decomposer program and the printer-end (printer-side) spooler program (later-described) are previously installed in the non-volatile storage device of the storage unit 40. The printer control unit 38 performs decomposition processing with a decomposer program. In the later-described fourth embodiment, as shown by the broken line in FIG. 1, the identification image print control program is also installed in the non-volatile storage device of the storage unit 40. The installation of the identification image print control program in the storage unit 40 of the printer 14 can be carried out, for example, at the time of manufacturing the printer 14. Alternatively, the computer 12 may carry out the installation by executing a predetermined setup program with the CPU 12A. In the embodiment in which the identification image print control program is installed in the storage unit 40 of the printer 14, the printer control unit 38 executes the identification image print control program. Thereby, the printer 14 acts as the identification image print control unit of the print control apparatus according to the invention.

Next, an identification image, which is added (composed) to the print object document will be described. As described above, the image forming unit 44 forms the color image with coloring agents of the plural color components, i.e., toners of Y, M, C, and K. Of the toners of the color components, only the K toner contains an infrared absorption color (carbon). Therefore, when an image formed and printed with the toners of Y, M, and C is irradiated with infrared light, the printed image cannot be visually identified since absorption of the infrared light by the toners substantially does not occur. However, when the image formed and printed only with the K toner is irradiated with infrared light, the printed image can be visually identified since the infrared light is absorbed by the K toner.

Figure 2:
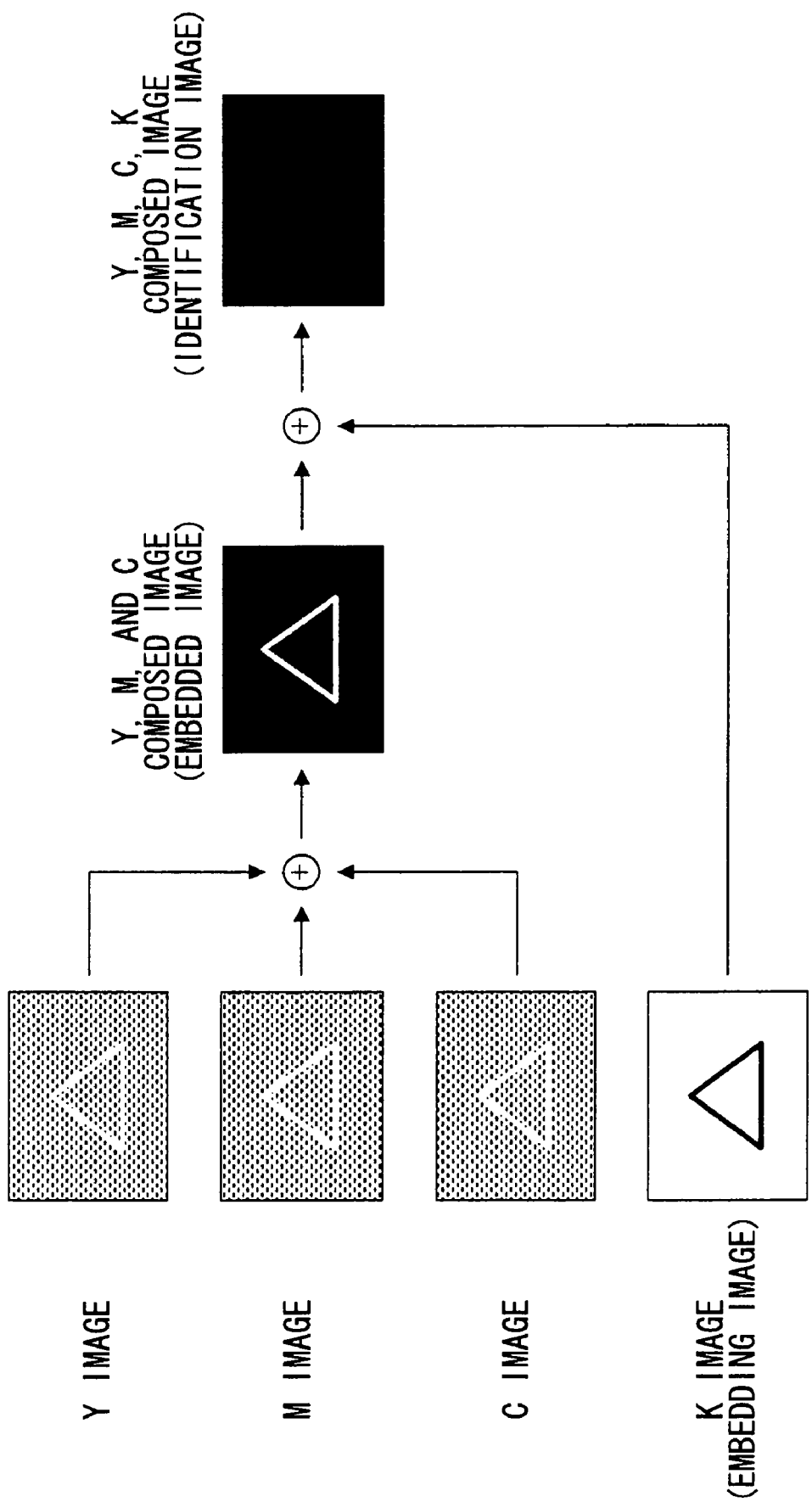
FIG. 2 is a concept view for explaining the scheme of an identification image according to the invention.

The identification image is an image produced to utilize the above-described phenomenon in order to enable determination of the authenticity of a document. As shown in FIG. 2 for example, the identification image can be formed by an embedding image including only the color component of K and an embedded image including the color components of Y, M, and C other than the K color component where the embedding image and the embedded image are superposed on each other. In FIG. 2, a line drawing expressing the outer shape of a predetermined figure (triangle) is shown as an example of the embedding image, and a solid-color image whose entire surface has a constant color and constant density is shown as an example of the embedded image. However, the embodiments are not limited to the examples. Each of the embedding image and the embedded image can be an image having multiple tones (for example, an image depicting nature). More particularly, full color images including many colors can be applied to the embedded image.

In order to make the embedded image unnoticeable on the paper when outputted by printing, first regions formed in m by m pixels (m is an integer not lower than 2) and second regions formed in n by n pixels (n is an integer not lower than 1 and lower than m) are provided in the identification image. While plural independent first regions are arranged around a single second region with no space between each other, plural independent second regions are arranged along the outer periphery of a single first region at substantially equal intervals to each other. The embedded image is placed on the first regions in the form of a dot image, and the embedding image is placed on the second regions in the form of a dot image. Further, the embedded image is processed so that visual identification of the embedding image is made difficult with visible light when the embedded image is printed with the embedding image superposed thereon. That is, the embedded image is processed so that the density of the portion thereof which is to be superposed with the line drawing of the embedding image becomes lower by the density of the line drawing of the embedding image (i.e., the portion appears to have the same density as the original density due to the density of the line drawing of the embedding image being superposed thereon). The identification image can be an image formed such that the embedding image is placed on the second regions and in the form of a dot image, and the embedded image is placed on the first regions in the form of a multi-level image instead of a dot image, and subjected to the above-described processing.

Thereby, when the identification image is formed with the toners of Y, M, C, K on the basis of the identification image data (in the embodiment, given as bitmap data of Y, M, C and K color space representing the identification image by separating it into the color components of Y, M, C and K), and is printed on a recording paper, the embedding image is printed only with the K toner and the embedded image is printed with the toners of Y, M, and C. Therefore, in the identification image on the recording paper, only the embedded image can be visually identified and the embedding image cannot be visually identified when the identification image is observed under irradiation of visible light, and the embedding image can be visually identified and existence thereof verified only when the identification image is observed under irradiation of infrared light.

On the other hand, there are cases where the identification image is copied to another recording paper, involving the identification image printed on a recording paper being read by a scanner and printed on another recording paper by any printer on the basis of the image data obtained by the scanner. However, the scanner is configured to read an object image by separating the image into R, G, B color components and cannot distinguish "black" in the embedded image which is formed by the toners of Y, M, and C from "black" in the embedding image which is formed by the K toner in the image. Thus, the scanner outputs the image data in a condition where the embedded image and the embedding image are not separated (the embedded image and the embedding image are mixed each other). Therefore, the existence of the embedding image cannot be verified although the identification image printed (copied) on another recording paper in the above described manner is observed under irradiation of infrared light.

Accordingly, when printing a document of which there is fear of illegal utilization of the reproduction, determination of the authenticity of the document (distinction between an authorized document having identification image data printed thereon and a reproduction thereof) becomes easier by printing the identification image using the identification image data on the same recording paper of the document. The determination can be carried out by irradiating the identification image printed on the document with infrared light to verify whether the embedding image can be visually identified.

When an instruction for printing document data of the print object document produced or edited by the document processing application is given through the document processing application, the document data is converted into intermediate print data described in a page description language by a printer driver (particularly by the CPU 12A which executes a program of the printer driver.) Further, the intermediate print data is transferred from the computer 12 to the printer 14 through the communication line 16, expanded to a print image data of Y, M, C, K by the decomposition processing of the printer control unit 38, and then the print image data is transferred to the image forming unit 44 for printing. Plural types of printer drivers are provided as a printer driver for printing the document by the printer 14 (for example, PostScript (R) driver, PLW (Printer Language for Windows)(R) driver, and the like). The plural types of printer drivers include a printer driver (for example, PLW driver), in which the image data of the Y, M, C, K color space included in the information of the document is always converted into image data of another color space (for example, R, G, B color space.) In this type of printer driver, the image data of another color space is re-converted into the image data of the Y, M, C, K color space after a predetermined processing is performed, and then used for printing.

Further, among the plural types of printer drivers, printer drivers (for example, PostScript (R) driver) which can perform printing without converting image data of the Y, M, C, K color space of document information into image data of another color space are provided with plural print modes (for example, high-resolution mode and high-speed printing mode). The plural print modes include a print mode (for example, high-speed print mode), in which image data of the Y, M, C, K color space is always converted into image data of another color space (for example, R, G, B color space). In this print mode, the image data of another color space is re-converted into image data of the Y, M, C, K color space after a predetermined processing is performed, and then the image data is used for printing. When the above-described printer driver or the above-described print mode is selected, at the stage in which the identification image data of the Y, M, C, K color space added to the document information is converted into the identification image data of the R, G, B color space, black in the embedded image and black in the embedding image are mixed together in the resultant identification image. This results in the problem that the identification image cannot be correctly printed (i.e., the embedding image cannot be visually identified when the embedding image is observed under irradiation of infrared light).

Therefore, in the first embodiment, only a particular printer driver (for example, PostScript(R) driver) which can perform printing without converting the image data of the Y, M, C, K color space included in the print object document information into the image data of another color space is previously installed as a printer driver for printing the document with the printer 14 in the HDD 28 of the computer 12. Plural print modes such as high-resolution mode and high-speed print mode are provided in the particular printer driver. Therefore, in the first embodiment, a particular printer driver is set to be always operated in the print mode (high-resolution mode) without converting the image data of the Y, M, C, K color space into image data of another color space when printing is performed.

Next, printing of the print object document by the first embodiment will be described referring to FIG. 3. In the first embodiment, the identification image print control program is installed on the HDD 28 of the computer 12, and the identification image data is also previously stored on the HDD 28. A user can start a document processing application on the computer 12, and can produce a print object document or update (edit) a print object document, which has been produced by and stored in another computer, by operating the keyboard 24 or the mouse 26 to use the document processing application. When an instruction for printing the produced or updated document is given through the document processing application, usually the printer driver is activated on the computer 12 (i.e., the printer driver program is executed by the CPU 12A). In the first embodiment, when the instruction for printing the document is given, the identification image print control program is activated on the computer 12 (i.e., executed by the CPU 12A), and document data of the print object document in which the identification image is not composed is transferred from the document processing application to the identification image print control program as shown in FIG. 3.

The activation of the identification image print control program upon sending of an instruction for printing the document, can be implemented by developing and installing a control program that hooks the instruction for printing and activates the identification image print control program, utilizing SDK (Software Development Kit) provided by a manufacturer of the document processing application or the operating system installed on the HDD 28 of the computer 12. When the document data is transferred from the document processing application, the identification image print control program performs reading of the identification image data from the HDD 28, and adds the read identification image data to the document data so that the identification image is composed at a pre-determined and certain position on the document. Then, the printer driver is activated on the computer 12, and the document data to which the identification image data is added is transferred to an activated particular printer driver (see FIG. 3).

In the identification image print control program according to the first embodiment, when print object document data is transferred from a document processing application, identification image data is always added to the document data. Thus, the print system 10 according to the first embodiment functions as a system specialized for the printing of documents to which identification image is added. Alternatively, the identification image print control program can be configured so that it determines whether the composition of the identification image has been instructed by a user at the time of activation and adds the identification image data to the document data only when the composition of the identification image is instructed.

In the first embodiment, only a particular printer driver which can perform printing without converting the image data of the Y, M, C, K color space included in the document information into image data of another color space is previously installed. Therefore, the particular printer driver is automatically activated by the above-described processing, and converts the transferred document data into the intermediate print data described with a predetermined page description language (i.e., the first processing). Further, the particular printer driver is previously set to be always operated in high-resolution mode. Therefore, the particular printer driver converts the transferred document data into the intermediate print data in the high-resolution mode.

Particularly, as shown in FIG. 3, the intermediate print data includes a header and a main data body. Data representing the print object document (text data representing text described in the document, image data representing images added to the document, and the like) is described in the main data body. Parameters for specifying the color space in which the decomposition processing executed by the computer 14 should be performed is added to each set of data described in the main data body. FIG. 3 shows the parameter, for example, described as "YMCKwrite( . . . ) specifying that the data should be processed in the Y, M, C, K color space. When the high-resolution mode is set as the print mode, the particular printer driver adds the parameter specifying that the data should be processed in the Y, M, C, K color space to each set of data described in the main data body of the intermediate print data (see FIG. 3).

Attribute information of the print object document is set in the header of the intermediate print data, and the attribute information includes mode specifying information that specifies the print mode in decomposition processing. When information that specifies the high-speed print mode is set as the mode-specifying information, higher priority is given to this print mode specification than the specification by the parameter described in each set of data in the main data body. Therefore, a parameter that specifies the data should be processed in the Y, M, C, K color space is added to the intermediate data. The data described in the main data body of the intermediate print data will be also once converted into the R, G, and B color space, and then re-converted into data of the Y, M, C, K color space by later-described decomposition processing. Therefore, when the high-speed mode is set as the print mode, the particular printer driver sets the information specifying the high-resolution mode as the print mode in the decomposition processing. In the high-resolution mode, printing is performed without converting the image data of the Y, M, C, K color space included in the document information into image data of another color space. In FIG. 3, the information for specifying the high-resolution mode is described as "mode: High resolution".

When the intermediate print data of the document is generated in the above-described manner, the particular printer driver activates the spooler by executing the spooler program with the CPU 12A (see FIG. 3), and the generated intermediate print data of the document is transferred to the spooler. The spooler sequentially accumulates and stores the intermediate print data generated by the printer driver on the HDD 28, communicates with the printer 14 through the network interface 20, and sequentially reads the accumulated and stored intermediate print data from the HDD 28 and transfers it to the printer 14.

In the printer 14, a printer-end spooler (see FIG. 3) is activated by execution of a printer-end spooler program by the printer control unit 38 at the time of receiving the intermediate print data transferred from the computer 12. The printer-end spooler sequentially accumulates and stores the intermediate print data received from the computer 12 in the non-volatile storage device of the storage unit 40, activates the decomposer by executing a decomposer program with the printer control unit 38, and sequentially fetches the accumulated and stored intermediate print data from the storage device and transfers it to the decomposer.

The decomposer determines the specified print mode by referring to the header of the intermediate print data transferred from the printer-end spooler, and determines the color space where each set of data described in the main data body of the intermediate print data should be processed, on the basis of the determined print mode and the parameter added to each set of data. After color space conversion is performed on the basis of the determination result if needed, the predetermined processing (for example, color correction, density correction, and image compression or the like) is performed. Then, the decomposition processing which generates the print image data of the Y, M, C, K color space representing the document is performed by drawing each of the resultant data of the above processing in the form of bitmap data of Y, M, C, K. The decomposer transfers the generated print image data to the image forming unit 44, and the image forming unit 44 prints the document represented by the print image data on a recording paper.

In the first embodiment, the particular printer driver is permanently used for printing the document by the printer 14. The particular printer driver can perform printing without converting the image data of the Y, M, C, K color space included in the document information into image data of another color image. Further, the high-resolution mode is permanently used as the print mode. In the high-resolution mode, printing can be performed without converting the image data of the Y, M, C, K color space included in the document information into image data of another color image. Therefore, the identification image data (the bitmap data of the Y, M, C, K color space representing the identification image) which is added to the document data by the identification image print control program can be composed in the print image data by the decomposition processing of the decomposer without being converted into image data of another color image such as an R, G, B color space.

By printing the document with the above processed print image data, the identification image can be correctly printed so that the authenticity of the document can be determined. When the identification image on printed matter obtained by the image forming unit 44 is observed under irradiation of infrared light, the existence of the embedding image can be verified. Further, with the first embodiment, in printing the document with the identification image composed therewith, there is no need for a user to select the printer driver or the print mode in order to print the identification image correctly, thus the burden on a user can be reduced.

Figure 4:
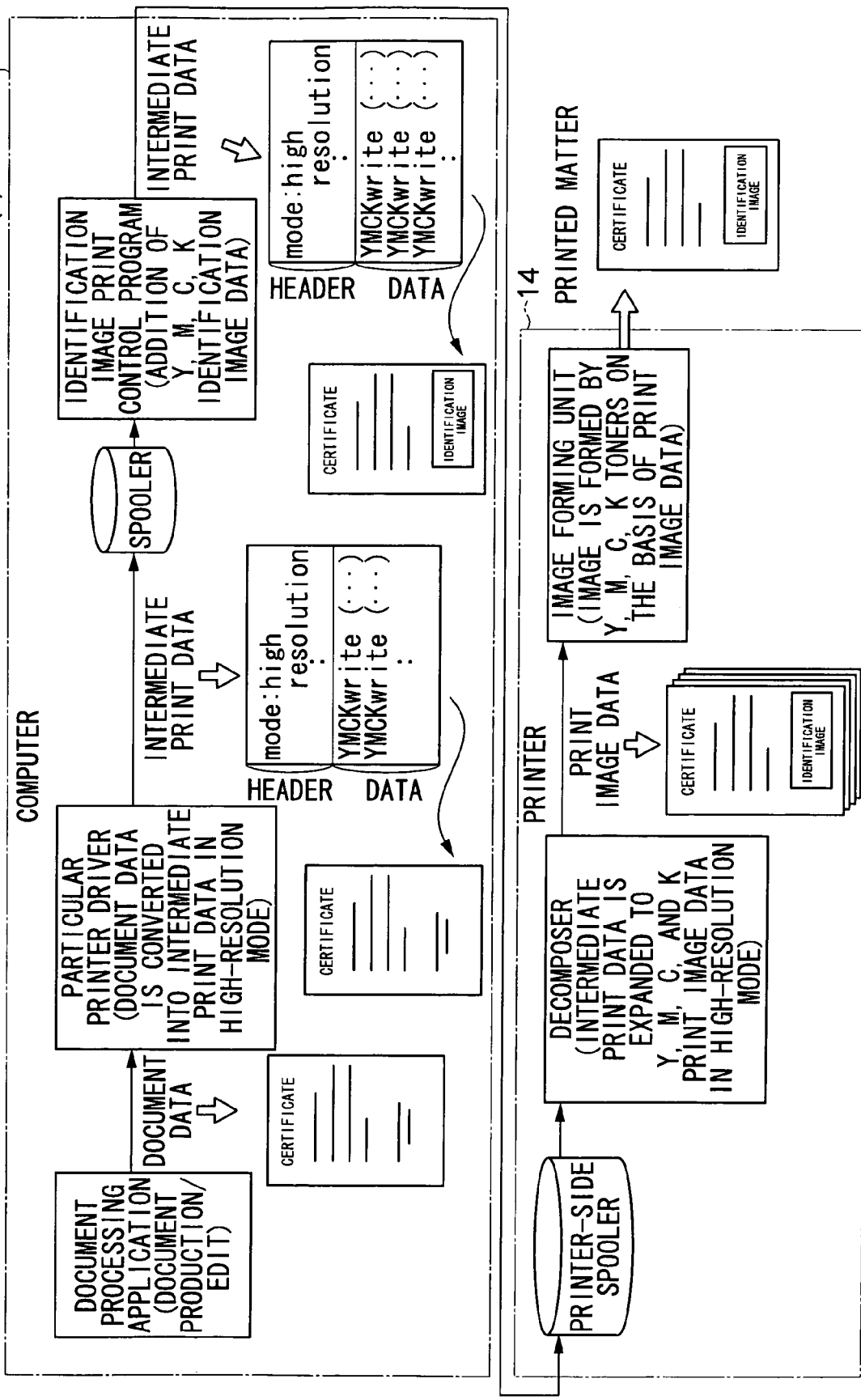
FIG. 4 is a concept view showing another example of the document print processing in the first embodiment.

In the above described embodiment, the identification image print control program is activated when an instruction for printing the document is given through the document processing application, and the identification image data is added to the document data by the identification image print control program, and thereby the identification image is added to the document (see FIG. 3). However, the invention is not limited thereto. A predetermined program (a program usually referred to as a printer processor) is activated when the spooler transfers the intermediate print data to the printer 14, but alternatively, for example, as shown in FIG. 4, the identification image print control program can be activated instead of the predetermined program. The identification image can be added to the document by adding the identification image data to the intermediate print data, which is generated by the particular printer driver, by the identification image print control program. The addition of the identification image data to the intermediate print data can be carried out, for example, by appending identification image data, to which the parameter specifying that the data should be processed in the Y, M, C, K color space, or the parameter specifying the composing position of the identification image on the document are added, to the main data body of the intermediate print data.

Second Embodiment

Next, the second embodiment of the invention will be described. Since each embodiment described below has a similar configuration to the first embodiment, each constituent is represented by the same reference numeral, and description thereof is omitted. Only the operation, which is different from the first embodiment, will be described.

Figure 5:
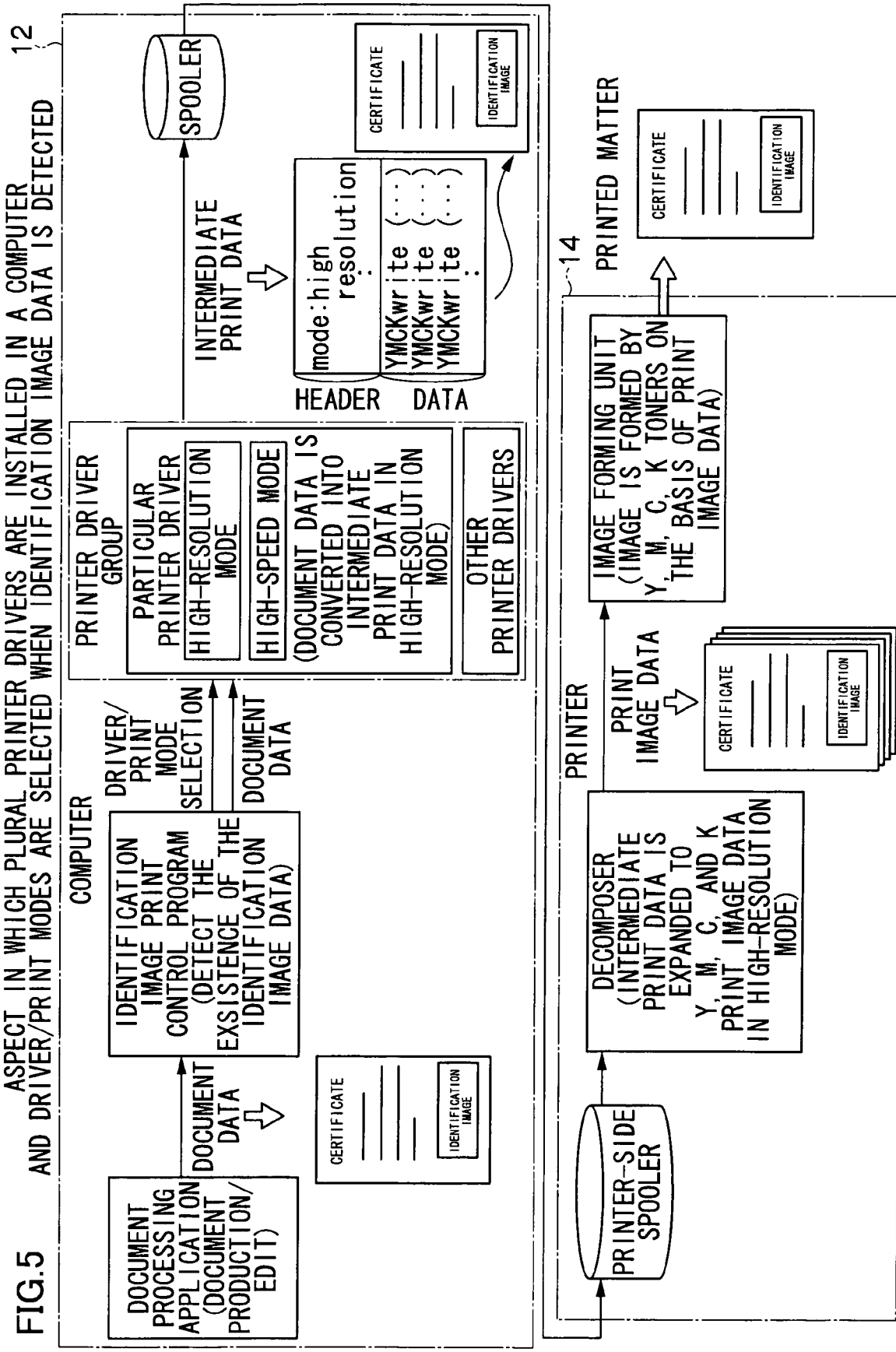
FIG. 5 is a concept view showing the document print processing in a second embodiment.

As shown in FIG. 5, in the second embodiment, the plural printer drivers including the particular printer driver described in the first embodiment are installed as the printer driver for printing a document with the printer 14 on the HDD 28 of the computer 12. The second embodiment differs from the first embodiment in that the plural print modes are provided in each printer driver and the print mode used during printing is not permanent. Further, in the second embodiment, when an instruction for composing (adding) the identification image is given by a user through the document processing application activated on the computer 12, the identification image data is added to the document data by the document processing application.

When the instruction for printing the print object document is given through the document processing application, the identification image print control program is activated on the computer 12, and the print object document data is transferred from the document processing application to the identification image print control program. When the document data is transferred from the document processing application, the identification image print control program determines whether the identification image data has been added to the transferred document data or not. In the second embodiment, a user can specify any printer driver and any print mode in the print instruction. If it is determined that the identification image data has not been added to the document data, the identification image print control program activates the printer driver specified by the user, and transfers the document data (document data to which the identification image data has not been added) to the activated printer driver. At the same time, the identification image print control program notifies the activated printer driver of the print mode specified by the user in the print instruction to perform processing to generate the intermediate print data from the transferred document data in the specified print mode.

On the other hand, if it is determined that the identification image data has been added to the transferred document data, regardless of the specification of the printer driver or the print mode in the print instruction made by the user, the identification image print control program activates the particular printer driver which can perform printing without converting the image data of the Y, M, C, K color space included in the document information into image data of another color space. The identification image print control program transfers the document data (document data to which the identification image data has been added) to the activated particular printer driver, and notifies the particular printer driver that the high-resolution mode is the print mode to be used in the processing. In the high-resolution mode, printing is performed without converting the image data of the Y, M, C, K color space into image data of another color space. Thereby, the processing for generating intermediate print data from the transferred document data is performed in the high-resolution mode by the particular printer driver.

Thus, similar to the first embodiment, for the document to which the identification image data is added, the identification image data can be composed in the print image data by the decomposition processing carried out by the decomposer without being converted into image data of another color space such as R, G, B color space. The identification image can be correctly printed so that the authenticity of the document can be determined by using the print image data for printing the document. The existence of the embedding image can be verified in the identification image printed on the printed matter obtained by the image forming unit 44 when observing it under irradiation of infrared light.

Also in the second embodiment, as in the first embodiment, when printing the document in which the identification image is composed, there is no need for a user to select the printer driver and the print mode in order to print correctly the identification image. Even if a user selects an improper printer driver or print mode, the improper printer driver or print mode can be automatically changed to the proper printer driver or print mode. Therefore, the burden on a user can also be reduced in printing the print object document in which the identification image is composed.

In the second embodiment, it has been described that the identification image data is previously added to the document data of the print object document, which is to be printed with the identification image composed thereon. However, the invention is not limited thereto. For example, the identification image print control program can be configured to determine whether an instruction for composing the identification image is given by a user or not. If an instruction for composing the identification image is given, in addition to the selection processing of the printer driver and the print mode described above, the addition (composition) of the identification image to the print object document can be performed. The addition of the identification image can be performed with respect to the document data, as shown in FIG. 3, or alternatively can be performed with respect to the intermediate print data, as shown in FIG. 4.

Third Embodiment

Next, the third embodiment of the invention will be described. As shown in FIG. 6, in the third embodiment, the identification image print control program according to the invention includes a first program which is activated when an instruction for printing the print object document is given through the document processing application, and a second program which is activated when the intermediate print data is transferred from the spooler to the printer 14.

When an instruction for printing the document is given through the document processing application, the first program of the identification image print control program is activated on the computer 12, and the document data is transferred from the document processing application. When the document data is transferred from the document processing application, the activated first program determines whether the document represented by the transferred document data is a document for which the composition of the identification image has been instructed by a user or not. Only if the document is determined to be one for which the composition of the identification image has been instructed, the instruction for adding the identification image to the document is outputted to the second program. The first program activates the printer driver specified by the user in the print instruction, and transfers the document data to the printer driver. In addition, the first program notifies the activated printer driver of the print mode specified by the user in the print instruction to perform generation of the intermediate print data from the transferred document data in the specified print mode.

In the third embodiment, the generation of the intermediate print data from the document data is performed by the printer driver and the print mode both specified by the user. Therefore, printing using the intermediate print data generated by the above processing, without converting the image data of the Y, M, C, K color space included in the document information into image data of another color space, is not ensured of being performed. For example, in FIG. 6, information specifying the high-speed print mode as a print mode in the decomposition processing for the intermediate print data (the mode-specifying information is described as "mode: high speed" in FIG. 6) is set in the header. Further, a parameter specifying that the decomposition processing to be performed in the R, G, B color space (the parameter is described as "RGBwrite( . . . )" in FIG. 6) is added to each data described in the main data body.

In the third embodiment, if the print object document is a document for which the instruction for composing the identification image is not given, the instruction for adding the identification image is not outputted from the first program to the second program. Therefore, the second program, which is activated when the intermediate print data is transferred from the spooler to the printer 14, simply transfers the intermediate print data of the document to the printer 14 without performing processing such as adding the identification image data thereto. In this case, according to the mode specifying information set in the header of the intermediate print data and the parameter added to each set of data described in the main data body of the intermediate print data, a predetermined processing is performed by the decomposer to generate the print image data, in some cases, after the intermediate print data is converted into the image data of the R, G, B color space. Then, the document is printed in an ordinary manner without composing the identification image.

On the other hand, if the document is a document for which the instruction for composing the identification image is given, the instruction for adding the identification image is outputted from the first program to the second program. The second program reads the identification image data from the HDD 28, adds a parameter either specifying that the identification image data should be processed in the Y, M, C, K color space or specifying the composing position of the identification image on the document to the identification image data. Then the second program appends the identification image data to the main data body of the intermediate print data. The composing position specified by the parameter is used for the determination of the expanding position of the identification image when the intermediate print data is expanded to the print image data (bitmap data) by the decomposer. Further, the second program overwrites the information that is set in the header of the intermediate print data with the information specifying the high-resolution mode as the print mode used in the decomposition processing, and then transfers the intermediate print data to the printer 14.

Thus, for the document in which the instruction for composing the identification image is given, after the identification image data is added to the intermediate print data, the identification image data is composed in the print image data by the decomposition processing of the decomposer without being converted into image data of another color space. The identification image is correctly printed so that the authenticity of the document can be determined by using the print image data in printing the document. The existence of the embedding image can be verified in the identification image printed on the printed matter obtained by the image forming unit 44 when observing it under irradiation of infrared light.

In the third embodiment, when it is desired that the print object document be printed with the identification image composed in the print object document, the identification image is correctly printed only by instructing that the identification image be composed in the print object document. There is no need for a user to select the proper printer driver or print mode in order to print the identification image correctly. Therefore, the burden on a user can be reduced when the document is printed with the identification image composed thereon.

It is described that, in the third embodiment, the identification image data is not originally added to the document data of the print object document, and added to the intermediate print data when the instruction for composing the identification image is given by a user. However, the invention is not limited thereto. The identification image data can be added to the document from the start, which is to be printed with the identification image composed thereon. In this case, by determining whether the identification image data is added to the document data or not, it is possible to determine that the print object document is a document for which the instruction for composing the identification image is given. The identification image can be correctly printed by overwriting the identification image data added to the intermediate print data generated through the processing by the printer driver with the authorized identification image data by the second program of the identification image print control program.

Fourth Embodiment

Next, the fourth embodiment of the invention will be described. In the fourth embodiment, the identification image print control program is installed in the non-volatile storage device of the storage unit 40 of the printer 14, and the identification image data is also stored in the storage device. As shown in FIG. 7, when the generation of the identification image data by the decomposer is completed, the identification image print control program is activated by the printer control unit 38. The identification image print control program reads out the identification image data from the non-volatile storage device to compose it in the print image data. The identification image print control program transfers the print image data to the image forming unit 44 for causing the image forming unit 44 to print the document in which the identification image is composed.

Since the identification image data is composed in the print image data after the print image data of the bitmap data of the Y, M, C, K color space is generated, the change of identification image data to a data in which the identification image cannot be correctly printed because of the influence of the processing in the printer driver or the decomposer can be prevented. Accordingly, the identification image can be correctly printed so that the authenticity of the document can be determined. The existence of the embedding image can be verified on the identification image printed on the printed matter obtained by the image forming unit 44 by observing it under irradiation of the infrared light.

In the fourth embodiment, in printing the print object document in which the identification image should be composed, the identification image can be correctly printed even in the case where the printer driver in which the print object data of the Y, M, C, K color space is printed after once being converted into data of another color space such as the R, G, B color space is used, or the high-speed print mode is applied as the print mode. Therefore, the document in which the identification image is composed can be printed at relatively high speed by selecting the above-described printer driver or print mode.

Since the identification image data is always composed in the print image data, the print system 10 according to the fourth embodiment functions as the system specialized to perform printing for documents in which the identification image is composed, as similar as to the first embodiment. Instead of this, the invention may be configured so that it determines whether an instruction for composing the identification image is given by a user or not, and the identification image data can be composed in the document (the print image data) only when it is determined that the instruction for composing the identification image is given. In the case where the identification image data is already added to the document data, the identification image data, which is composed in the print image data generated by the decomposer can be overwritten with the authorized identification image data. Also in this case, the identification image can be correctly printed.

Fifth Embodiment

Next, the fifth embodiment of the invention will be described. As shown in FIG. 8, as in the third embodiment, the identification image print control program according to the invention includes a first program which is activated when the instruction for printing the print object document is given through the document processing application and a second program which is activated when the intermediate print data is transferred from the spooler to the printer 14.

In the first to fourth embodiments described above, it is assumed that the identification image is composed at a predetermined position on the print object document. However, in the fifth embodiment, when the document processing application is activated on the computer 12, a temporary identification image can be displayed on the display 22 wherein the processing object document is also displayed. Further, a user can freely specify the composing position of the identification image on the document by operating the mouse 26 and changing the display position of the temporary identification image on the displayed document. When the user specifies the composing position of the identification image, the temporary identification image data is added to a document information corresponding to the document, and the composing position information indicating the specified composing position of the identification image is also added. The temporary identification image is shown in a broken line in FIG. 8.

In the fifth embodiment, the instruction for printing the print object document is given through the document processing application, the first program of the identification image print control program is activated on the computer 12, and the document data of the document is transferred from the document processing application to the first program. Then, the first program determines whether the temporary identification image data is added or not to the document data transferred from the document processing application. If the temporary identification image data is added, the first program obtains the composing position information, which is added the document data. The first program outputs the composing position information to the second program only when the temporary identification image data has been added to the document data.

The first program activates the printer driver specified by the user in the print instruction. The first program transfers the document data to the activated printer driver, and notifies the printer driver of the print mode specified by the user in the print instruction. Thus, the processing for generating the intermediate print data from the transferred document data is performed in the specified print mode. In the fifth embodiment, the generation of the intermediate print data from the document data is carried out in the print mode and the printer driver both specified by the user. Therefore, as with the third embodiment, printing using the intermediate print data generated by the above-described processing, without converting the image data of the Y, M, C, K color space included in the document information into image data of another color space, is not ensured of being performed.

In the fifth embodiment, when the temporary identification image data is not added to the document data, the composing position information will not outputted from the first program to the second program. Therefore, the second program simply transfers the intermediate print data of the document to the printer 14, without performing any processing to the intermediate print data, such as adding the identification image data, which is described below. In this case, according to the mode specifying information set in the header of the intermediate print data and the parameter added to each set of data described in the main data body of the intermediate print data, a predetermined processing is performed by the decomposer to generate the print image data, under some case after the intermediate print data is converted into the image data of the R, G, B color space. Then, the print object document is printed in ordinary manner without composing the identification image.

On the other hand, if the temporary identification image data has been added to the document data, the composing position information is outputted from the first program to the second program. Therefore, the second program reads out the authorized identification image data from the HDD 28, adds the parameter specifying the authorized identification image data should be processed in the Y, M, C, K color space or the parameter for specifying the composing position of the identification image on the document (the composing position represented by the composing position information inputted from the first program) to the authorized identification image data. Then, the temporary identification image data described in the main data body of the intermediate print data is overwritten with the authorized identification image data to which the parameters are added. Further, the second program overwrites the information set in the header in the intermediate print data with the information specifying the high-resolution mode as the print mode in the decomposition processing, and then transfers the intermediate print data to the printer 14.

Thus, for the print object document in which the temporary identification image data is composed at any composing position, the authorized identification image data is added to the intermediate print data by overwriting the temporary identification image data with the authorized identification image data, and the information for indicating the position where the temporary identification image data is composed to the intermediate print data as a parameter. The authorized identification image data added to the intermediate print data is composed in the print image data at the composing position, indicated by the composing position information, by the decomposition processing of the decomposer without converted into data of another color space such as the R, G, B color space.

Thus, according to the fifth embodiment, the identification image can be composed at any position on the print object document, and the print object document is printed on the basis of the print image data. Therefore, the identification image can be correctly printed at the position on the document specified by the temporary identification image so that the authenticity of the document can be determined. The existence of the embedding image can be verified in the identification image, which is printed on the printed matter obtained by the image forming unit 44 when observing it under irradiation of the infrared light.

In the fifth embodiment, it is described that, at the stage in which the intermediate print data is generated by the printer driver, the temporary identification image data included in the intermediate print data is overwritten with the authorized identification image data. However, the invention is not limited thereto. After the print image data is generated by the decomposer, the temporary identification image data included in the generated print image data can be overwritten with the authorized identification image data.

Further, the identification image according to the invention is described as an image formed by superposing the embedding image including only the K color component, and the embedded image including the Y, M, and C color components without the K color component for an example. However, the particular color component used for the print of the embedding image can be any color component in which the light reflectance of the coloring agent is different from that of the coloring agent of the other color components in a particular wave length range (including wave length ranges other than infrared), and another color component satisfying the above-described condition can be applied as the particular color component.

What is claimed is:

1. A print control apparatus that generates print image data of a particular color space representing a print object document in the form of a plurality of color components into which the document has been separated by performing predetermined processing of document information of the print object document, in order to print the document with a printer using coloring agents of the plurality of color components, the print control apparatus comprising:

an identification image controller that controls identification image data given as data of the particular color space representing an identification image in the form of separated color components, to add the identification image data to the print image data without color space conversion being performed when the printer prints the document in which the identification image is composed;

a plurality of printer drivers; and a decomposer, wherein the identification image comprises an embedding image including only one particular color component from among the plurality of color components, and an embedded image including color components from the plurality of color components other than the particular color component, the embedding image and the embedded image are formed to be superposed on each other, the embedded image is processed in advance so that visual identification of the embedding image is difficult under visible light when the embedding image and the embedded image are printed, the predetermined processing comprises first processing that converts document information of the print object document into intermediate print data described in a page description language by the printer driver, and second processing that expands the intermediate print data into the print image data by the decomposer, the plurality of printer drivers includes a plurality of types of printer drivers, each performing different processing within the first processing, the plurality of types of printer drivers further includes a particular printer driver which can perform printing without once converting print object data of the particular color space into data of another color space, the particular printer driver has a first print mode that performs printing without once converting print object data of the particular color space into data of another color space, and a second print mode that performs printing with once converting print object data of the particular color space into data of another color space, the identification image controller executes control causing the particular printer driver to perform the first processing in the first print mode for the document information to which the identification image data is added, the second processing includes a first print mode that performs printing without once converting print object data of the particular color space included in the intermediate print data into data of another color space, and a second print mode that performs printing with once converting print object data of particular color space into data of another color space, print mode specifying information, for specifying the print mode in the second processing, is set by the printer drivers in the intermediate print data, and the identification image controller adds the identification image data to the intermediate print data and rewrites the print mode specifying information as information specifying the first print mode, when an instruction for printing the document with the identification image composed thereon is given.

2. The print control apparatus according to claim 1, wherein
the coloring agents are toners,
the plurality of color components are Y, M, C, and K, and
the particular color component is K in which the toner contains an infrared absorption color.

3. The print control apparatus according to claim 1, wherein the identification image comprises
first regions formed in m by m pixels (m is an integer not lower than 2) and second regions formed in n by n pixels (n is an integer not lower than 1 and lower than m),
a plurality of independent first regions are arranged around a single second region with no spaces between, and a plurality of independent second regions are arranged along the outer periphery of a single first region at substantially equal intervals,
the embedded image is placed on the first regions in the form of a dot image, and the embedding image is placed on the second regions in the form of a dot image.

4. The print control apparatus according to claim 1, further comprising a determination unit that determines whether the identification image data is added to the document information or not,
wherein the identification image controller is activated when the determination unit determines that the identification image data is added to the document information.

5. The print control apparatus according to claim 1, wherein the identification image controller adds the identification image data to the document information, when an instruction is given for printing the document with the identification image composed thereon.

6. The print control apparatus according to claim 1, wherein the identification image controller adds the identification image data to the print image data after the print image data of the particular color space is generated, when an instruction is given for printing the document with the identification image composed thereon.

7. The print control apparatus according to claim 1, further comprising:
a display unit,
a specifying unit that specifies a composing position of the identification image on the document while the document is displayed on the display unit on the basis of the document information, and
a display controller that displays the identification image at the composing position specified through the specifying unit,
wherein the identification image controller performs the addition or composition of the identification image data such that the document in which the identification image is composed at the composing position specified through the specifying unit is printed.

8. A print control method for generating print image data of a particular color space representing a print object document in the form of a plurality of color components into which the document has been separated, by performing predetermined processing of document information of the document in order to print the print object document with a printer using coloring agents of the plurality of color components, the print control method comprising:
controlling identification image data given as data of the particular color space representing an identification image in the form of the separated color components to add the identification image data to the print image data without performing color space conversion when printing the document on which the identification image is composed;
executing predetermined processing according to first processing, by a plurality of print drivers including a plurality of types of printer drivers, each performing different processing within the first processing, including a particular printer driver which can perform printing without once converting print object data of the particular color space into data of another color space, and second processing, the first processing converting document information of the print object document into intermediate print data described in a page description language by one of the printer drivers, and the second processing expanding the intermediate print data into the print image data by using a decomposer;
performing printing through the particular printer driver having a first print mode without once converting print object data of the particular color space into data of another color space;
performing printing through the particular driver having a second print mode with once converting print object data of the particular color space into data of another color space; and
executing control to cause the particular printer driver to perform the first processing in the first print mode for the document information to which the identification image data is added,
wherein the identification image comprises an embedding image including only one particular color component from among the plurality of color components, and an embedded image including color components from among the plurality of color components other than the particular color component,
the embedding image and the embedded image are formed to be superposed on each other,
the embedded image is processed in advance such that visual identification of the embedding image is difficult under visible light when the embedding image and the embedded image are printed,
the predetermined processing comprises first processing that converts the document information into intermediate print data described in a page description language by the printer driver, and second processing that expands the intermediate print data into the print image data by the decomposer,
the second processing includes a first print mode that performs printing without once converting the print object data of the particular color space into data of another color space, and a second print mode that performs printing with once converting the print object data of the particular color space into data of another color space,
print mode specifying information, for specifying the print mode in the second processing, is set by the printer driver in the intermediate print data, and
the controlling adds the identification image data to the intermediate print data, and rewrites the print mode specifying information as information specifying the first print mode, when an instruction for printing the document with the identification image composed thereon is given.

9. The print control method according to claim 8, wherein
the coloring agents are toners,
the plurality of color components are Y, M, C, and K, and
the particular color component is K in which the toner contains an infrared absorption color.

10. The print control method according to claim 8, wherein the identification image comprises first regions formed in m by m pixels (m is an integer not lower than 2) and second regions formed in n by n pixels (n is an integer not lower than 1 and lower than m), a plurality of independent first regions are arranged around a single second region with no spaces between, and a plurality of independent second regions are arranged along the outer periphery of a single first region at substantially equal intervals, the embedded image is placed on the first regions in the form of a dot image, and the embedding image is placed on the second regions in the form of a dot image.

11. The print control method according to claim 8, further comprising instructing the printing of the document with the identification image composed thereon,
wherein the controlling includes adding the identification image data to the document information, when the instruction is given.

12. The print control method according to claim 8, further comprising determining whether the identification image data is added to the document information or not,
wherein the controlling is performed only when a determination has been made as a result of the determining that the identification image data has been added to the document information.

13. The print control method according to claim 8, wherein the controlling includes adding the identification image data to the print image data after the print image data of the particular color space is generated, when an instruction is given for printing the document with the identification image composed thereon.

14. The print control method according to claim 8, further comprising:
displaying the document on the basis of the document information;
specifying a composing position of the identification image on the document; and
displaying the identification image at the specified composing position,
wherein the controlling includes adding the identification image data such that the document in which the identification image is composed at the specified composing position is printed.

15. A print control method for generating print image data in order to print a print object document in which an identification image is composed thereon by a printer connected to a computer, using coloring agents of a plurality of color components, the method comprising:
installing in advance a particular printer driver, which can perform printing without converting print object data of a particular color space into data of another color space, as a printer driver which performs first processing, in the computer;
setting in advance so that the first processing is always performed in a first print mode by the particular printer driver, when a first print mode that performs printing without once converting the print object data of the particular color space into data of another color space, and a second print mode that performs printing after print object data of the particular color space is once converted into the data of another color space, are provided in the particular printer driver;
executing predetermined processing according to first processing, by a plurality of print drivers including a plurality of types of printer drivers, each performing different processing within the first processing, and second processing;
performing printing through the particular printer driver having a first print mode without once converting print object data of the particular color space into data of another color space;
performing printing through the particular driver having a second print mode with once converting print object data of the particular color space into data of another color space; and
executing control to cause the particular printer driver to perform the first processing in the first print mode for the document information to which the identification image data is added,
wherein the identification image comprises an embedding image including only a particular color component from among the plurality of color components and an embedded image including color components from among the plurality of color components other than the particular color component, the embedding image and the embedded image are formed to be superposed on each other, and the embedded image is processed in advance such that visual identification of the embedding image is difficult under visible light when the embedding image and the embedded image are printed,
the generation of the print image data includes first processing that converts the document information into intermediate print data described in a page description language by the printer driver, and second processing that expands the intermediate print data into the print image data of the particular color space, which represents the document in the form of the plurality of color components into which the document has been separated, by a decomposer,
the predetermined processing comprises first processing that converts the document information into intermediate print data described in a page description language by the printer driver, and second processing that expands the intermediate print data into the print image data by the decomposer,
the second processing includes a first print mode that performs printing without once converting the print object data of the particular color space into data of another color space, and a second print mode that performs printing with once converting the print object data of the particular color space into data of another color space,
print mode specifying information, for specifying the print mode in the second processing, is set by the printer driver in the intermediate print data, and
the controlling adds the identification image data to the intermediate print data, and rewrites the print mode specifying information as information specifying the first print mode, when an instruction for printing the document with the identification image composed thereon is given.

16. A computer readable storage medium storing a program for a computer to execute processing for generating print image data of a particular color space representing a print object document in the form of a plurality of color components into which the document has been separated by performing predetermined processing of document information of the print object document, in order to print the document with a printer using coloring agents of the plurality of color components, the processing comprising:
controlling identification image data given as data of the particular color space representing an identification image in the form of separated color components to compose the identification image data in the print image data without performing color space conversion when printing the document in which the identification image is composed;

executing predetermined processing according to first processing, by a plurality of print drivers including a plurality of types of printer drivers, each performing different processing within the first processing, including a particular printer driver which can perform printing without once converting print object data of the particular color space into data of another color space, and second processing, first processing that converts document information of the print object document into intermediate print data described in a page description language by the printer driver, and second processing that expands the intermediate print data into the print image data by a decomposer;

performing printing through the particular printer driver having a first print mode without once converting print object data of the particular color space into data of another color space;

performing printing through the particular driver having a second print mode with once converting print object data of the particular color space into data of another color space; and executing control to cause the particular printer driver to perform the first processing in the first print mode for the document information to which the identification image data is added, wherein the identification image comprises an embedding image including only a particular color component from among the plurality of color components and an embedded image including color components from among the plurality of color components other than the particular color component, the embedding image and the embedded image are formed to be superposed on each other, and the embedded image is processed in advance such that visual identification of the embedding image is difficult under visible light when the embedding image and the embedded image are printed, the predetermined processing comprises first processing that converts the document information into intermediate print data described in a page description language by the printer driver, and second processing that expands the intermediate print data into the print image data by the decomposer, the second processing includes a first print mode that performs printing without once converting the print object data of the particular color space into data of another color space, and a second print mode that performs printing with once converting the print object data of the particular color space into data of another color space, print mode specifying information, for specifying the print mode in the second processing, is set by the printer driver in the intermediate print data, and the controlling adds the identification image data to the intermediate print data, and rewrites the print mode specifying information as information specifying the first print mode, when an instruction for printing the document with the identification image composed thereon is given.

* * * * *